United States Patent
Rayama (10) Patent No.: US 9,738,028 B2
(45) Date of Patent: Aug. 22, 2017

(54) THERMOFORMING APPARATUS WITH THE USE OF A PLASTIC SHEET CASSETTE

(71) Applicant: RAYAMA PACK CO., LTD., Katsushika-Ku, Tokyo (JP)

(72) Inventor: Yoshihiro Rayama, Tokyo (JP)

(73) Assignee: Rayama Pack Co., Ltd., Tokyo (JP)

( * ) Notice: Subject to any disclaimer, the term of this patent is extended or adjusted under 35 U.S.C. 154(b) by 153 days.

(21) Appl. No.: 14/725,671

(22) Filed: May 29, 2015

(65) Prior Publication Data

US 2015/0343699 A1 Dec. 3, 2015

(30) Foreign Application Priority Data

May 29, 2014 (JP) .................................. 2014-111115

(51) Int. Cl.
| | |
|---|---|
| B29C 51/26 | (2006.01) |
| B29C 51/10 | (2006.01) |
| B29K 105/00 | (2006.01) |
| B29C 51/08 | (2006.01) |
| B29C 51/18 | (2006.01) |

(52) U.S. Cl.
CPC ............ B29C 51/262 (2013.01); *B29C 51/08* (2013.01); *B29C 51/10* (2013.01); *B29C 51/18* (2013.01); *B29C 2791/006* (2013.01); *B29K 2105/256* (2013.01)

(58) Field of Classification Search
CPC . B29C 51/18; B29C 51/262; B29C 2791/006; B29C 51/10; B29C 51/08; B29K 2105/256
See application file for complete search history.

(56) References Cited

U.S. PATENT DOCUMENTS

| 2,690,593 A | 10/1954 | Abercrombie | |
| 2,694,227 A * | 11/1954 | Fordyce | B29C 51/10 |
| | | | 264/553 |
| 3,121,920 A * | 2/1964 | Doyle | B29C 33/04 |
| | | | 425/388 |

(Continued)

FOREIGN PATENT DOCUMENTS

| JP | 01-229613 A | 9/1989 |
| JP | 10-278907 A | 10/1998 |

(Continued)

*Primary Examiner* — Alison L Hindenlang
*Assistant Examiner* — Jerzi H Moreno Hernandez
(74) *Attorney, Agent, or Firm* — Carrier Blackman & Associates, P.C.; Joseph P. Carrier; Anne G. Sabourin (57) ABSTRACT

A plastic sheet cassette includes a first frame member pivotably coupled to a second frame member, and a plastic sheet is fixedly supported by male and female parts provided on the first and second frame members. A thermoforming apparatus includes a cabinet, a heating source, a vacuum source, a platform, and a fixing frame that supports the cassette so as to be removable, and is vertically movable between the heating source and the vacuum source in the cabinet. The fixing frame can be stopped or released at any desired level in the cabinet and supports the cassette so that the sheet is heated at the upper level by the heating source and is brought into close contact with a prototype at the lower level by the vacuum source for making a mold having the same shape as the prototype.

7 Claims, 8 Drawing Sheets

(56) References Cited

U.S. PATENT DOCUMENTS

| | | | | |
|---|---|---|---|---|
| 3,476,377 A | * | 11/1969 | Agrista | B25B 5/06 264/553 |
| 3,553,784 A | * | 1/1971 | Shuman | B29C 35/08 264/322 |
| 3,751,208 A | * | 8/1973 | Hepworth | B29C 51/18 425/388 |
| 5,015,167 A | | 5/1991 | Charles | |
| 5,382,152 A | * | 1/1995 | Ravera | B29C 51/262 414/744.6 |
| 5,855,931 A | * | 1/1999 | Lieb | B29C 51/10 425/3 |

FOREIGN PATENT DOCUMENTS

| | | |
|---|---|---|
| JP | 11-502779 A | 3/1999 |
| JP | 2004-306473 A | 11/2004 |
| JP | 2010-132002 A | 6/2010 |
| WO | 96/29189 A2 | 9/1996 |

* cited by examiner

THERMOFORMING APPARATUS WITH THE USE OF A PLASTIC SHEET CASSETTE

TECHNICAL FIELD

The present invention relates to a thermoforming apparatus with use of a plastic sheet cassette. When the thermoforming apparatus is employed to fabricate, e.g., molds made of plastic sheets and used in forming various confectioneries that are molded into predetermined shapes, or packaging made of plastic sheets and used in selling, exhibition, etc. in states accommodating and holding various three-dimensional goods to be packaged, the thermoforming apparatus can easily and reliably hold the plastic sheet for easier setting of the plastic sheet into the thermoforming apparatus, and can readily make the mold and the packaging made of the plastic sheet.

BACKGROUND ART

Hitherto, in the case of forming, e.g., chocolate confectioneries having predetermined shapes by pouring chocolate materials into molds, molds for trial have often been made using, e.g., plastic sheets in predetermined thicknesses. On the other hand, various three-dimensional objects, such as samples and models, have recently been manufactured by 3D printers. In trying to form a prototype that has the same shape as the three-dimensional object with use of a mold, a mold for trial is often made using a plastic sheet in a predetermined thickness by covering a plastic sheet over the three-dimensional object, which has been manufacturing by the 3D printer, and by shaping the plastic sheet with vacuum forming.

As one example of a technique for forming the above-described mold made of the plastic sheet, Patent Document 1 proposes a thermoforming apparatus and a thermoforming method for a plastic sheet. According to the proposed thermoforming apparatus and method, the apparatus includes a press provided with a heat plate for heating a plastic sheet and a forming box arranged movable relative to the press and provided with a sheet holder. The mold made of the plastic sheet is produced by causing the heated plastic sheet to be brought into close contact with a forming die fitted in the forming box that has been moved to a position under the press while a space underside of the forming die is evacuated.

PRIOR ART DOCUMENTS

Patent Document

Patent Document 1: JP H10-278907 A

SUMMARY OF INVENTION

Technical Problem

With the thermoforming apparatus and method proposed in Patent Document 1, it is required to accurately position and set the forming die into the forming box, and to directly attach the plastic sheet to an attachment frame that is disposed at an opening of the forming box. Moreover, the apparatus includes various mechanisms for moving the forming box in the horizontal direction, for moving the heat plate in the vertical direction, etc. Accordingly, the apparatus is necessarily of a large size and expensive as a matter of course.

With utilization of 3D printers, relatively small three-dimensional objects to be used as samples or the likes have been relatively easily provided in these years. However, if the apparatus and the method disclosed in Patent Document 1 are employed to make a mold for trial using the three-dimensional object obtained with the 3D printing, the production of the mold for trial would be difficult to practice. Under such a situation, a simple thermoforming apparatus is demanded which can easily make, e.g., a mold for trial used to form a sample or the like, and which can easily set a plastic sheet in position.

In consideration of the above-described state of the art, an object of the present invention is to provide a thermoforming apparatus with use of a plastic sheet cassette, wherein, when a plastic sheet to be formed into, e.g., a trial mold is set in the thermoforming apparatus, the plastic sheet can be simply fixed and supported by the plastic sheet cassette in a sandwiched state and simply and easily loaded into the thermoforming apparatus while being fixed in the cassette. Because the size of the thermoforming apparatus can be reduced to such a small size as adapted to be installed on a desk, for example, the thermoforming apparatus with use of a plastic sheet cassette can be easily handled.

Solution to Problem

To solve the above-mentioned problem, a thermoforming apparatus according to the present invention is constituted as described below with addition of reference signs that are used in later description of embodiments of the present invention. A thermoforming apparatus 30, 130 comprises: a cabinet 31, 131; a heating source 32, 132 disposed in an upper portion of the cabinet; a vacuum source 35, 135 disposed in a lower portion of the cabinet 31, 131; a platform 37, 137 that has perforations 38, 138 and is disposed above the vacuum source 35, 135, and on which a prototype B is placed; a plastic sheet cassette 1, 101 that fixedly supports a plastic sheet P in a detachable way; and a cassette fixing frame 41, 141 that detachably supports the plastic sheet cassette 1, 101 and that is vertically moved within the cabinet 31, 131 between the heating source 32, 132 and the vacuum source 35, 135. The cassette fixing frame 41, 141 has a parallelogram shape, in a plan view, defined by right and left cassette sliding supports 42, 142 into which right and left frames of the plastic sheet cassette 1, 101 are slide-fitted, respectively, and front and rear cassette supports 43, 143 coupling the right and left cassette sliding supports 42, 142 to each other at front and rear ends of the cassette sliding supports. The cassette fixing frame 41, 141 is provided with operation handles 45, 145 for operating the cassette fixing frame 41, 141 to move vertically. The operation handles 45, 145 are mounted to the cassette sliding supports 42, 142 through supports 44, 144 to extend outside the cabinet 31, 131.

The cassette slide supports 42, 142 of the cassette fixing frame 41, 141 may be formed in a channel shaped cross-section allowing the right and left frame portions of the plastic sheet cassette 1, 101 to be slide-fitted into the cassette fixing frame 41, 141 from a front side of the thermoforming apparatus.

The cabinet 31, 131 may include guide means 40, 140 for guiding the cassette fixing frame 41, 141 to be vertically movable.

The plastic sheet cassette 101 may be constituted to be foldable by coupling a first frame member 110 and a second frame member 120 in an openable and closable way with a hinge 118. The frame members 110, 120 hold a peripheral edge of the plastic sheet P in a sandwiched state. One of opposing surfaces of the first and second frame members 110, 120 which can be brought into contact with each other, may include pins 116 which are capable of being gone through fixation holes P1 in the plastic sheet, while the other of the opposing surfaces including holes 117 capable of receiving the pins 116. Positioning of the plastic sheet P may be made when the plastic sheet P is held between the first frame member 110 and the second frame member 120 in the sandwiched state.

The cassette fixing frame 141 may be constituted by integrating a lower frame 151 which has a parallelogram shape in plan view and an upper frame 152 which has a substantially channel-shape or U-shape opened on the front side in a plan view, while a spacer 153 is interposed between the lower and upper frames to secure a space for accommodating the plastic sheet cassette 101. The cassette fixing frame 141 includes the right and left cassette slide supports 142 each having a recessed groove in cross-section, and the rear cassette support 143 determining, on the rear side, a depth through which the plastic sheet cassette 101 is loaded. There may be provided with a front cassette support on the front side of the lower frame 151 of the cassette fixing frame 141.

The guide means 140 may be constituted by four guide poles 161 vertically arranged at right and left positions on the front and rear of the cabinet 131, and the cassette fixing frame 141 may include at four corners thereof openings 162 through which the guide poles 161 are penetrated.

The operation handles 145 are mounted on the cassette fixing frame 141 so as to be angularly movable about supports 144 which are disposed on the right and left sides of the cassette fixing frame 141, through stopper means 165. The stopper means 165 support the operation handles 145 through handle coupling arms 166 so as to be angularly movable relative to the cassette fixing frame 141. The handle coupling arms 166 of the stopper means 165 are provided with pressing pads 167 that are each pressed against a structural frame 155 of the cabinet 131 to prevent vertical movement of the cassette fixing frame 141. A resilient member 168 is interposed between the handle coupling arm 166 and a part, e.g., the spacer 153, of the cassette fixing frame 141, and the pressing pad 167 is always pressed against the structural frame 155 of the cabinet 131 by a resilient force of the resilient member 168 to hold the cassette fixing frame 141 at any level within the cabinet 131 in a vertical direction. The cassette fixing frame 141 is vertically movable within the cabinet 131 when the operation handles 145 are each angularly moved together with the handle coupling arms 166 to move the pressing pad 167 in a direction away from the structural frame 155 of the cabinet 131 against the resilient force of the resilient member 168.

In the thermoforming apparatus as described above with use of the plastic sheet cassette according to the present invention, the plastic sheet is vertically moved to make a mold having the same shape as the external contour of the prototype, i.e., at first to the position near the heating source disposed in the upper portion of the cabinet, thereby heating and softening the plastic sheet; and then to the position where the plastic sheet can be brought into close contact with and tightly cover a prototype that is placed on the platform disposed in the lower portion of the cabinet while air under the prototype is being sucked with operation of the vacuum source.

The slide supports of the cassette fixing frame in the thermoforming apparatus are constituted such that the plastic sheet cassette holding the plastic sheet in the sandwiched state is slide-loaded into and supported by the cassette fixing frame, and that the cassette fixing frame is smoothly moved in the vertical direction through the guide means disposed in the cabinet of the thermoforming apparatus. Furthermore, since the operation handles extending outside the cabinet are coupled to the supports on the cassette fixing frame, the cassette fixing frame having the plastic sheet cassette is smoothly moved in the vertical direction by the operation handles. Thus, the operations of moving the cassette fixing frame to the vicinity of the heating source and bringing the plastic sheet into close contact with the prototype on the platform are facilitated.

Since the fixation holes in the peripheral edge of the plastic sheet are engaged with the pins on the plastic sheet cassette, the plastic sheet to be brought into close contact with the prototype is firmly held by the plastic sheet cassette in the sandwiched state. Even in the state where the plastic sheet is subjected to the suction action of the vacuum source, or even in the state where the plastic sheet is brought into close contact with the prototype and is caused to expand over the prototype, it is neither slipped off nor detached from the plastic sheet cassette.

Since the guide poles constituting the guide means are inserted through the guided portions formed in the cassette fixing frame, the cassette fixing frame is smoothly raised and lowered with the operation handles being held by hands.

The stopper means stop the vertical movement of the cassette fixing frame by resiliently pressing the pressing pads provided on the hand coupling arms against the structural members of the cabinet by the resilient actions of the resilient members. Accordingly, a height position of the cassette fixing frame within the cabinet can optionally be changed and adjusted. Furthermore, when the operation handles are angularly moved against the resilient forces of the resilient members in directions to release the pressing actions of the pressing pads, the height position of the cassette fixing frame is optionally changeable in the vertical direction such that the cassette fixing frame can be raised toward the heating position and lowered toward the prototype on the platform.

Advantageous Effect of Invention

According to the present invention constituted as described above, when the plastic sheet to be formed into, e.g., a mold for trial is set in the thermoforming apparatus, the plastic sheet can be loaded into the thermoforming apparatus in a state fixed to the plastic sheet cassette that holds the plastic sheet in the sandwiched state. Namely, the plastic sheet can be simply and accurately positioned in and fixed to the plastic sheet cassette with the engagement between the fixation holes in the sheet and the pins on the frame. In addition, since the thermoforming apparatus is constituted in such a small size as adapted to be installed on a desk, for example, the thermoforming apparatus is easy to handle, and a mold for trial, etc. can be made simply.

More specifically, to obtain the above-mentioned advantageous effects, the thermoforming apparatus according to the present invention includes the cabinet, the heating source, the vacuum source, and the platform, as well as the cassette fixing frame that detachably receives and supports the plastic sheet cassette to which the plastic sheet is fixedly held in a removable way, and that is vertically moved within the cabinet between the heating source and the vacuum source. With those features, the thermoforming apparatus can simply and easily perform the operations of: for example, reliably supporting and fixing the plastic sheet, loading and setting the plastic sheet into the thermoforming apparatus, heating and softening the plastic sheet, and bringing the plastic sheet into close contact with the prototype for molding the same shape as the external contour of the prototype.

Since the cassette fixing frame of the thermoforming apparatus has the right and left cassette slide supports, into which the right and left frames of the plastic sheet cassette are slide-fitted, the plastic sheet can simply and accurately be positioned and set in the thermoforming apparatus just by sliding the plastic sheet cassette into the cassette fixing frame. Furthermore, it is possible to smoothen a mold making process that is carried out through the operations of: moving upward the plastic sheet which is fixedly supported by the plastic sheet cassette toward the heating source for heating and softening the plastic sheet, moving downward the plastic sheet toward the platform for covering the plastic sheet over the prototype on the platform, and actuating the vacuum source for bringing the plastic sheet into intimate contact with the prototype to make a trial mold.

Since the guided portions corresponding to the guide means provided in the cabinet are provided in the cassette slide supports of the cassette fixing frame, the cassette fixing frame can smoothly be moved in the vertical direction in the cabinet along the guide means. Accordingly, the operations of: for example, moving the plastic sheet which is fixedly supported by the plastic sheet cassette, toward the heating source, and bringing the plastic sheet into close contact with the prototype on the platform, can be performed quickly.

Since the guide poles constituting the guide means are penetrated through the guided portions of the cassette fixing frame at four corners thereof, the cassette fixing frame can smoothly be moved in the vertical direction just by raising and lowering the operation handles, which are mounted on the cassette fixing frame, with hands, for example. Therefore, the operations of raising the plastic sheet which is supported by the cassette fixing frame toward the vicinity of the heating source, and lowering the plastic sheet to be brought into close contact with the prototype put on the platform can be performed in a stable manner without causing wobbling.

In relation to the vertical movement of the cassette fixing frame, since the operation handles supported by the supports disposed on the cassette fixing frame are arranged to extend outside the cabinet, the cassette fixing frame and the plastic sheet cassette can be operated to move vertically from the outside of the cabinet. In addition, since the plastic sheet cassette can be removed from the cassette fixing frame in the cabinet, the plastic sheet can be handled outside the cabinet, the plastic sheet insertion and removal operations can stably be performed without being affected by a high-temperature atmosphere generated by the heating source and a vacuum atmosphere generated by the vacuum source in the cabinet.

The operation handles mounted to the cassette fixing frame are angularly movable relative to the cassette fixing frame through the stopper means, and the stopper means can be operated by angularly moving the operation handles such that the pressing pads mounted on the handle coupling arms come into a state resiliently pressed against the structural elements of the cabinet to prevent the cassette fixing frame from moving, or that the pressing pads are released from the pressed state. Namely, under a condition that the pressed state is released by angularly moving the operation handles against the resilient forces of the resilient members, the cassette fixing frame is vertically movable. When the operation of angularly moving the operation handles is ceased, the pressing pads on the handle coupling arms are pressed against the structural elements of the cabinet by the resilient forces of the resilient members, and positioning of the cassette fixing frame can be made at a desired level within the cabinet. Accordingly, the following operations can be performed rapidly: heating and softening the plastic sheet at the raised position near the heating source, bringing the plastic sheet into close contact with the prototype on the platform under the evacuation by the vacuum source to make a mold having the same shape as the external contour of the prototype.

The reference numerals/signs added in the "Solution to Problem" above are intended for easier reference to components illustrated in the drawings. The present invention is not limited to structures, shapes, and so on, which are explained in the following description and are denoted by the reference numerals, signs, etc. in the drawings.

BRIEF DESCRIPTION OF THE DRAWINGS

FIGS. 7(A) and 7(B) are sectional views of principal components of the stopper means to explain how it is operated. In FIG. 7(A), the stopper means allows the cassette fixing frame to vertically move, while in FIG. 7(B), the stopper means prevents the cassette fixing frame from moving under a force of the resilient members.

DESCRIPTION OF EMBODIMENTS

A first embodiment of the present invention will be described below with reference to FIGS. 1 through 4. Reference numeral 1 in the drawings denotes a plastic sheet cassette which is positioned and set in a removable way within a forming section of a thermoforming apparatus 30 according to the present invention, which is a desk-top type apparatus having such a small size as adapted to be placed on a desk, for example. The plastic sheet cassette 1 holds a plastic sheet P which has a predetermined thickness and an appropriate size, e.g., an A4, and which is adapted to be formed into, e.g., a mold for trial, such that the plastic sheet P is fixedly held in the cassette 1 in a sandwiched state with use of fixation holes perforated around the sheet P, for example. The plastic sheet cassette 1 is made of a metal material, such as aluminum, in consideration of, e.g., heat resistance during heating process when the plastic sheet cassette 1 is set into the thermoforming apparatus 30, and toughness during when the sheet P in the cassette 1 is brought into close contact with a prototype B under pressure.

Figure 1:
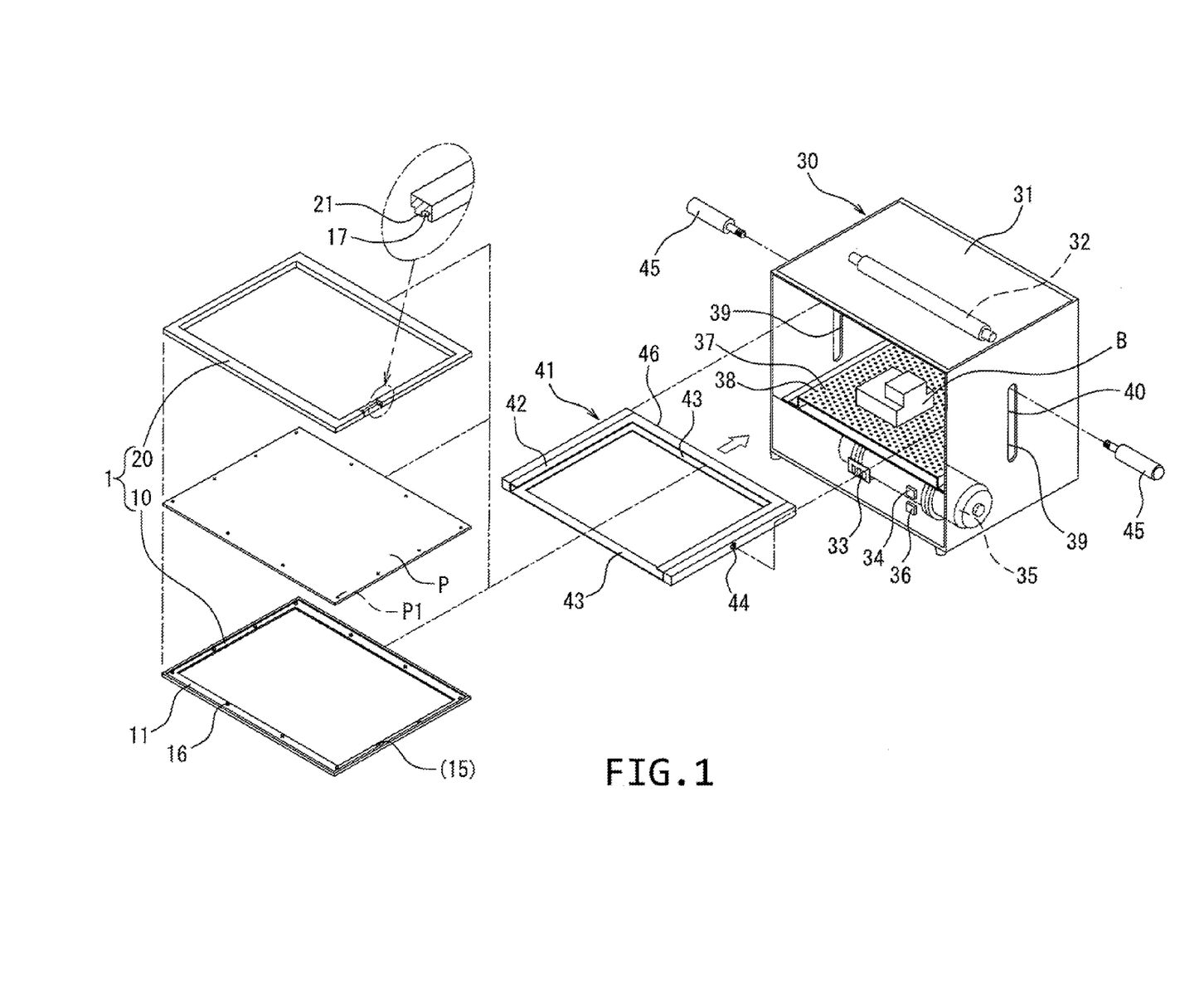
FIG. 1 is an exploded perspective view, partly cut away and including a partial enlarged view, of a first embodiment of a thermoforming apparatus according to the present invention, illustrating a cassette fixing frame in a removed state from the cabinet and a plastic sheet cassette in a disassembled state.
Figure 2:
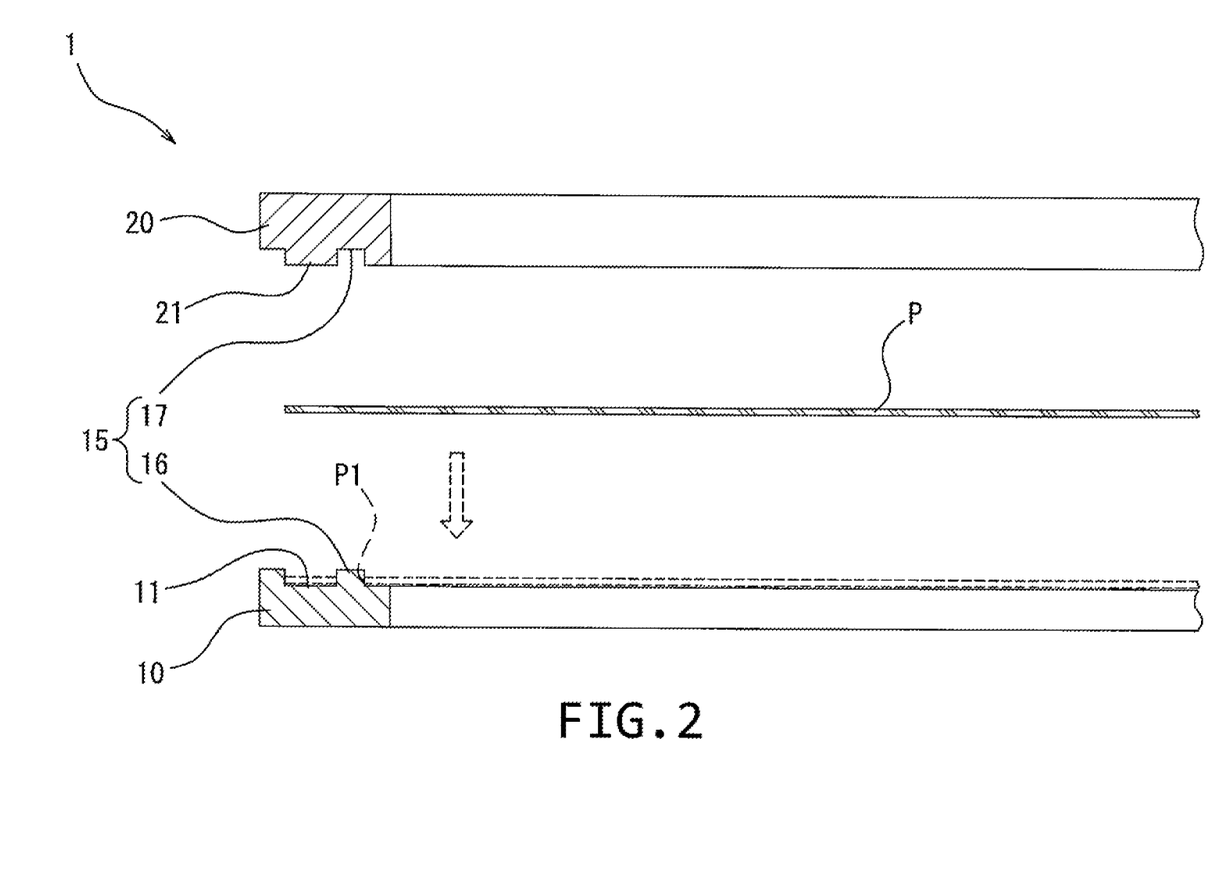
FIG. 2 is an exploded sectional view of the plastic sheet cassette wherein a plastic sheet is shown between upper and lower frame members.

More specifically, the plastic sheet cassette 1 includes a first frame member 10 in the form of a flat parallelogram which has a stepped recess 11 formed along an inner peripheral edge thereof and serving as a first contact face to hold a peripheral edge of one surface of the plastic sheet P which is made of vinyl chloride resin, for example, and a second frame member 20 also in the form of a flat parallelogram which has a stepped portion 21 formed along an inner peripheral edge thereof and projecting toward the stepped recess 11 of the first frame member 10 to be fitted therein. The plastic sheet cassette 1 further includes piercing means 15 provided on surfaces of the stepped recess 11 and the stepped projection 21, which surfaces come into contact with each other when the first and second frame members 10 and 20 are put together. The piercing means 15 pierces and make fixation holes in the peripheral edge of the plastic sheet P that is held in a sandwiched state when the stepped recess 11 and the stepped projection 21 are fitted to each other, in order to firmly hold the plastic sheet P between the first and second frame members 10, 20.

An outer edge of the stepped recess 11 of the first frame member 10 and an outer edge of the stepped projection 21 of the second frame member 20 have sizes substantially corresponding to a peripheral edge of the plastic sheet P such that the plastic sheet P to be sandwiched between them is accurately positioned in a state tightly fitted into the stepped recess 11 without a play.

Furthermore, in the state where the plastic sheet P is fitted and arranged in the stepped recess 11 of the first frame member 10, the stepped projection 21 of the second frame member 20 is also fitted in the stepped recess 11. When the stepped projection 21 is fitted in the stepped recess 11, the first frame member 10 and the second frame member 20 are combined into an integrated parallelogram member.

The depth of the stepped recess 11 and the height of the stepped projection 21 are substantially the same. The height of the plastic sheet cassette 1 when the plastic sheet P is held in the sandwiched state is set such that the plastic sheet cassette 1 can be slide-fitted into a later-described cassette fixing frame 41 of the thermoforming apparatus 30.

The individual piercing means 15 are each constituted by a male part 16 and a female part 17. The male part 16 has pin shaped projections provided in one of respective surfaces of the first and second frame members 10 and 20, the surfaces being of the stepped recess 11 and the stepped projection 21 opposed to each other. The female part 17 comprises recesses or holes formed in the other surface to be engaged with the male part 16. Preferably, a peripheral edge of an upper end of each projection of the male part 16 is formed into a shape slightly sharpened upward. Fixation holes are pierced in the plastic sheet P in match with an outer shape of the male part 16 and an inner shape of the female part 17 when the male part 16 and the female part 17 are engaged with each other in a state where the plastic sheet P is sandwiched between the stepped recess 11 of the first frame member 10 and the stepped projection 21 of the second frame member 20. In this state, the fixation holes in the plastic sheet P are engaged with the male part 16.

In the illustrated example, the male part 16 is arranged in the surface of the first frame member 10 where the stepped recess 11 is formed, and the female part 17 is arranged in the surface of the second frame member 20 where the stepped projection 21 is formed. However, the male part 16 and the female part 17 may be arranged in reversed relation. Any one of those arrangements can be selected optionally. When the fixation holes P1 are perforated in advance in the plastic sheet P, it is just required to form the male parts 16 and the female parts 17, which are engaged with each other through the fixation holes P1, without needing the piercing means 15.

Figure 5:
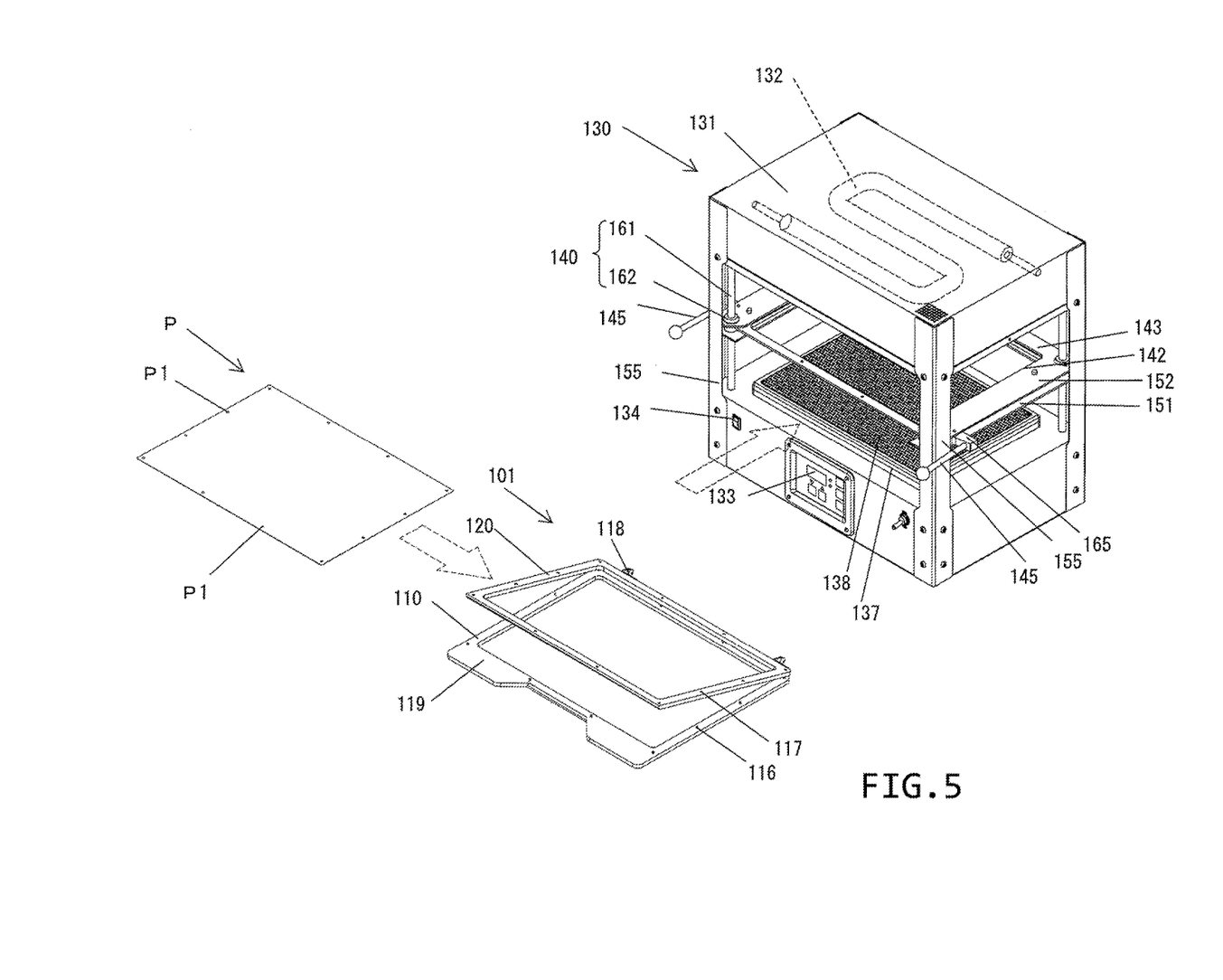
FIG. 5 is a schematic perspective view of a second embodiment of the thermoforming apparatus according to the present invention.

The plastic sheet cassette 1 may be constituted, for example, as illustrated in FIG. 5, in a foldable way to be capable of being opened and closed by coupling the first and second frame members 110, 120 to each other at their lateral edges by hinges 118. The plastic sheet cassette 101 is easy to handle with having this foldable configuration. Furthermore, a grip or a tab 119 may be associated with, e.g., the first frame member 110, which is located on the lower side, for convenience in, e.g., an operation of sliding the plastic sheet cassette 101 to be loaded into and unloaded from the later-described cassette fixing frame 141 of the thermoforming apparatus 130. Because the surfaces of the first and second frame members 110, 120 are just required to be opposed to each other and to hold the peripheral edge of the plastic sheet P in the sandwiched state, they may be constituted as flat surfaces without being limited to the illustrated engaging configuration between the recess and the projection.

On the other hand, with use of the plastic sheet cassette 1 constituted as described above, the thermoforming apparatus 30 forms the plastic sheet P into a mold for trial by bringing heated and softened plastic sheet P into close contact with or tightly covering the predetermined prototype B with the sheet P to mold the same shape as the outer contour of the prototype B by a vacuum forming process. The prototype B is, e.g., a handiwork scheduled to be produced by pouring a fluid material, which is solidified later, into a mold, or a product made by a 3D printer, for example. The thermoforming apparatus 30 is constituted, for example, as follows.

Figure 3:
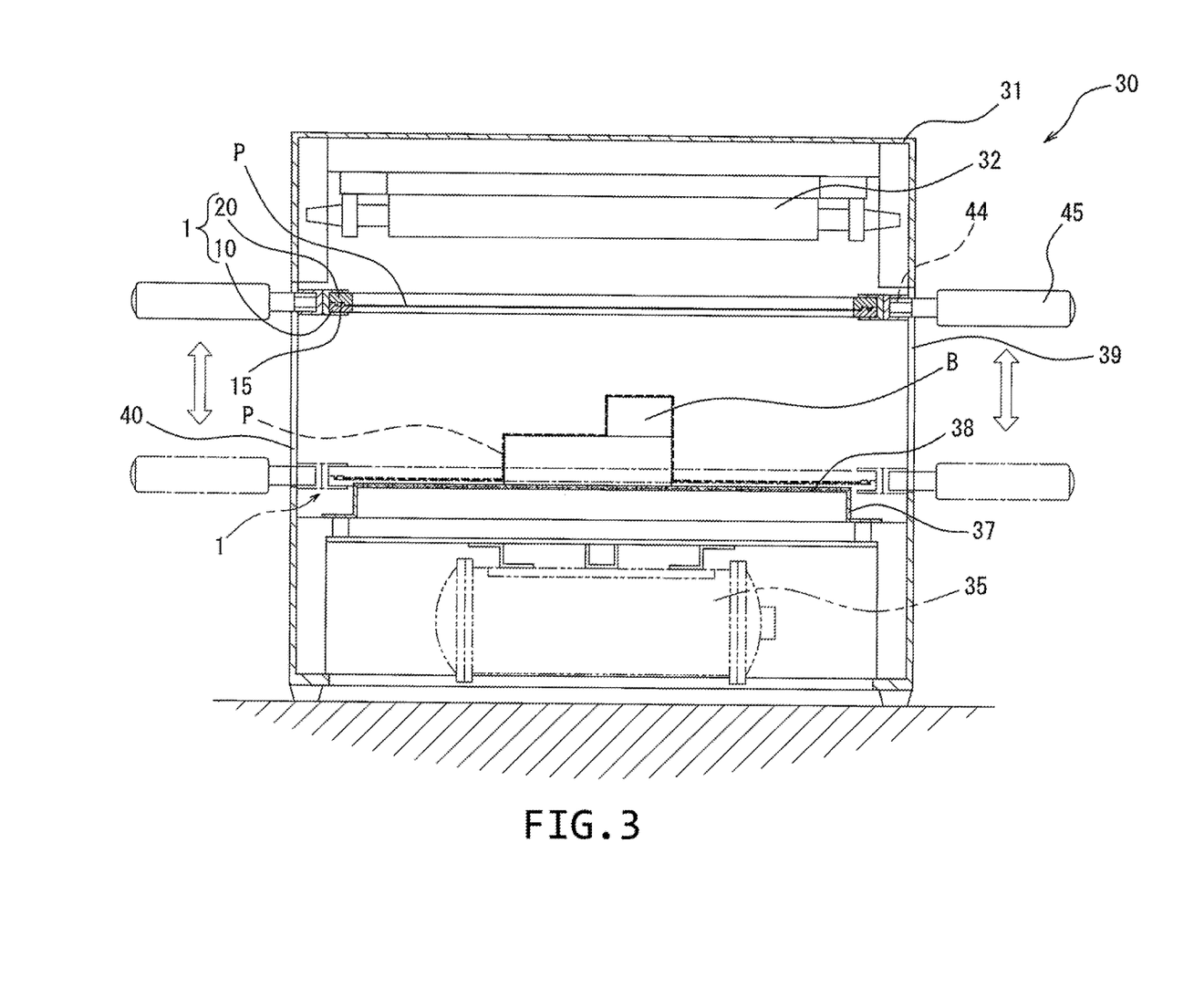
FIG. 3 is a front sectional view of the thermoforming apparatus of FIG. 1.
Figure 4:
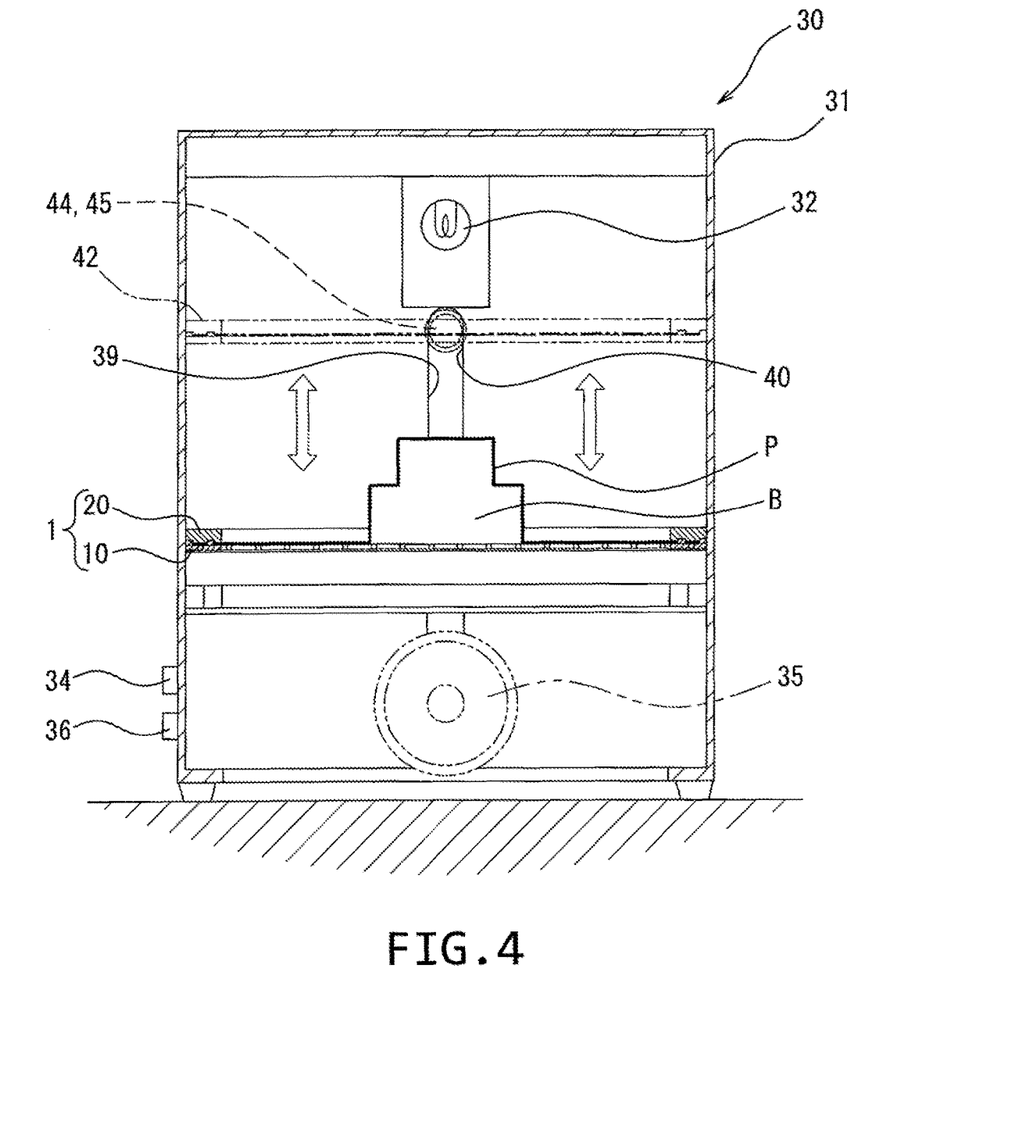
FIG. 4 is aside sectional view of the thermoforming apparatus of FIG. 1.

The thermoforming apparatus 30 includes an cabinet 31 having substantially a rectangular parallelepiped shape and having such a small size as adapted to be installed on a desk, for example, a heating source 32 disposed in an upper portion of the cabinet 31, a vacuum source 35 disposed in a lower portion of the cabinet 31, a platform 37 that is provided with perforations 38 formed over the platform 37, that is disposed above the vacuum source 35, and that allows the prototype B to be placed on the platform 37, and a cassette fixing frame 41 detachably supporting the plastic sheet cassette 1 to which the plastic sheet P is detachably fixed and held in the cassette 1. The cassette fixing frame 41 is arranged to be vertically movable within the cabinet 31 between the heating source 32 and the vacuum source 35.

The cabinet 31 has, corresponding to the size of the plastic sheet P of, e.g., A4 size, a planar size substantially slightly larger than that of the plastic sheet P such that the plastic sheet P can be slide-loaded into the cabinet 31 from the front side and set in place while it takes a substantially horizontal state. The cabinet 31 has a space with a height sufficient for accommodating the prototype B therein between the heating source 32 and the vacuum source 35. Furthermore, in the thermoforming apparatus 30 illustrated in FIG. 1, a front surface of the cabinet 31 is opened to allow, e.g., placement of the prototype B and slide-loading of the plastic sheet cassette 1 through the open front. In side walls of the cabinet 31, guide slits 39 are formed for insertion of operation handles 45 that are coupled to the cassette fixing frame 41 for vertically moving the cassette fixing frame 41 from the outside of the cabinet 31. The guide slits 39 for the operation handles 45 serve also as guide means 40 for the cassette fixing frame 41.

The heating source 32 is an electric heater and heats the plastic sheet P, which is raised and positioned just under the heater, to give the plastic sheet P with pliability enough to be brought into close contact with the prototype B for molding the same shape as the external contour of the prototype B when a trial mold for the prototype B is formed. The heating source 32 is controlled with the aid of a heat sensor such that a heating temperature can be adjustably set to 200° C., for example. The setting temperature is adjusted by a heater switch 34 disposed on, e.g., a front surface of the cabinet 31, and is displayed on, e.g., a digital thermometer 33 disposed on the front surface of the cabinet 31. The heating source 32 may be arranged within a heating chamber that is provided by forming a top wall of the cabinet 31 into an upwardly concave shape and disposing a heat reflector over an inner surface of the concave top wall of the cabinet 31. Such an arrangement is effective in increasing heat efficiency.

The vacuum source 35 is, for example, a vacuum pump and motor incorporated in a lower portion of the cabinet 31, and it forcedly evacuates a space under the platform 37 of air through perforations 38. The vacuum source 35 is turned on/off by an evacuation switch 36 on the front surface of the cabinet 31 or by a foot switch.

The platform 37 is fixed inside the cabinet 31 in a position where an inner space of the cabinet 31 is partitioned to the upper and lower sides at a substantially middle level relative to the height of the cabinet 31. The prototype B is placed and set on the platform 37. Air below the plastic sheet P arranged to cover the prototype B set on the platform 37 is forcedly vacuumed by the suction action of the vacuum source 35 via the perforations 38. The plastic sheet P is thereby brought into close contact with the prototype B.

As illustrated, the platform 37 has a main portion which rises from a peripheral edge region through a step to have a predetermined height. The plastic sheet P is covered over the prototype B set on a main portion of the platform 37. When the first frame member 10 and the second frame member 20 of the plastic sheet cassette 1 are moved downward, they are accurately positioned at the level of the main portion of the platform 37 such that the plastic sheet P is brought into close contact with the main portion of the platform 37 by the suction operation of the vacuum source 35 (see FIGS. 3 and 4). In other words, the size defined by a periphery of the main portion of the platform 37 is not larger than the sizes of the inner periphery of the first and second frame members 10, 20 of the plastic sheet cassette 1.

The perforations 38 are formed over an entire surface of the platform 37. When the platform 37 is formed as a punching board, for example, many perforations of the punching board can be used as air vent holes.

The cassette fixing frame 41 has, in a plan view, a parallelogram shape defined by right and left cassette slide supports 42 and front and rear supports 43 connecting the right and left cassette slide supports 42 to each other at front and rear ends of the cassette slide supports 42. The right and left cassette slide supports 42 are adapted to receive right and left frames of the plastic sheet cassette 1 which are slide-fitted into the supports 42, respectively. Handle supports 44 for supporting the operation handles 45, which are inserted through the guide slits 39 formed in sidewalls of the cabinet 31 and are mounted to the right and left cassette slide supports 42. Each of the various component members 42, 43, 44 and 45 of the cassette fixing frame 41 has a predetermined cross-section of a rectangular cylindrical, angled, or groove shape, etc. The plastic sheet cassette 1 supported within the cassette fixing frame 41 is accurately positioned at a predetermined location within the cassette fixing frame 41. For example, by inserting the plastic sheet cassette 1 into the cassette fixing frame 41 until abutting against a positioning piece 46 that is disposed on the rear support 43, the plastic sheet cassette 1 is accommodated and accurately positioned in the cassette fixing frame 41 at the predetermined location.

Figure 6:
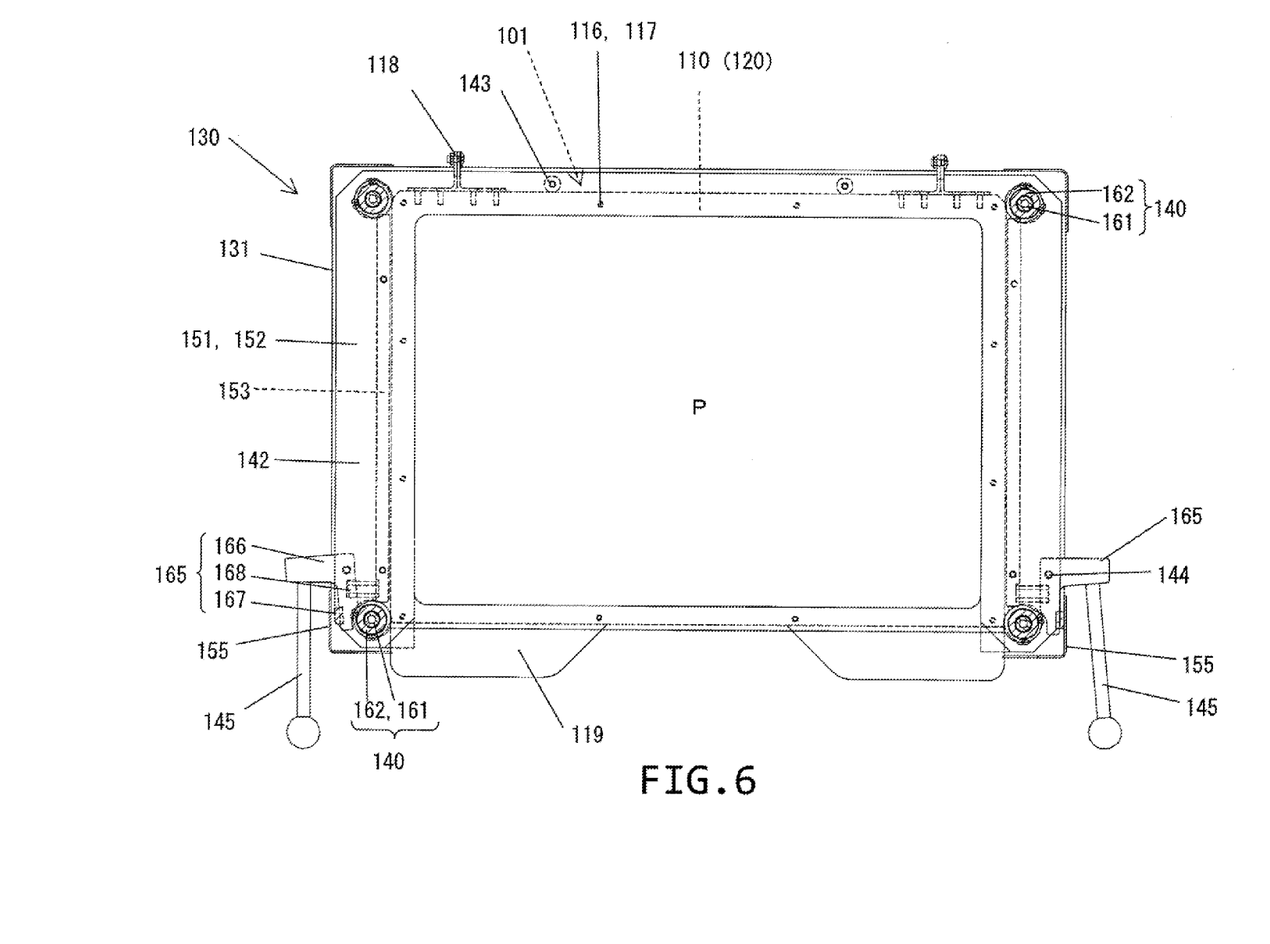
FIG. 6 is a horizontal sectional view of the thermoforming apparatus of FIG. 5, wherein a plastic sheet cassette is loaded and set in a cassette fixing frame.
Figure 8:
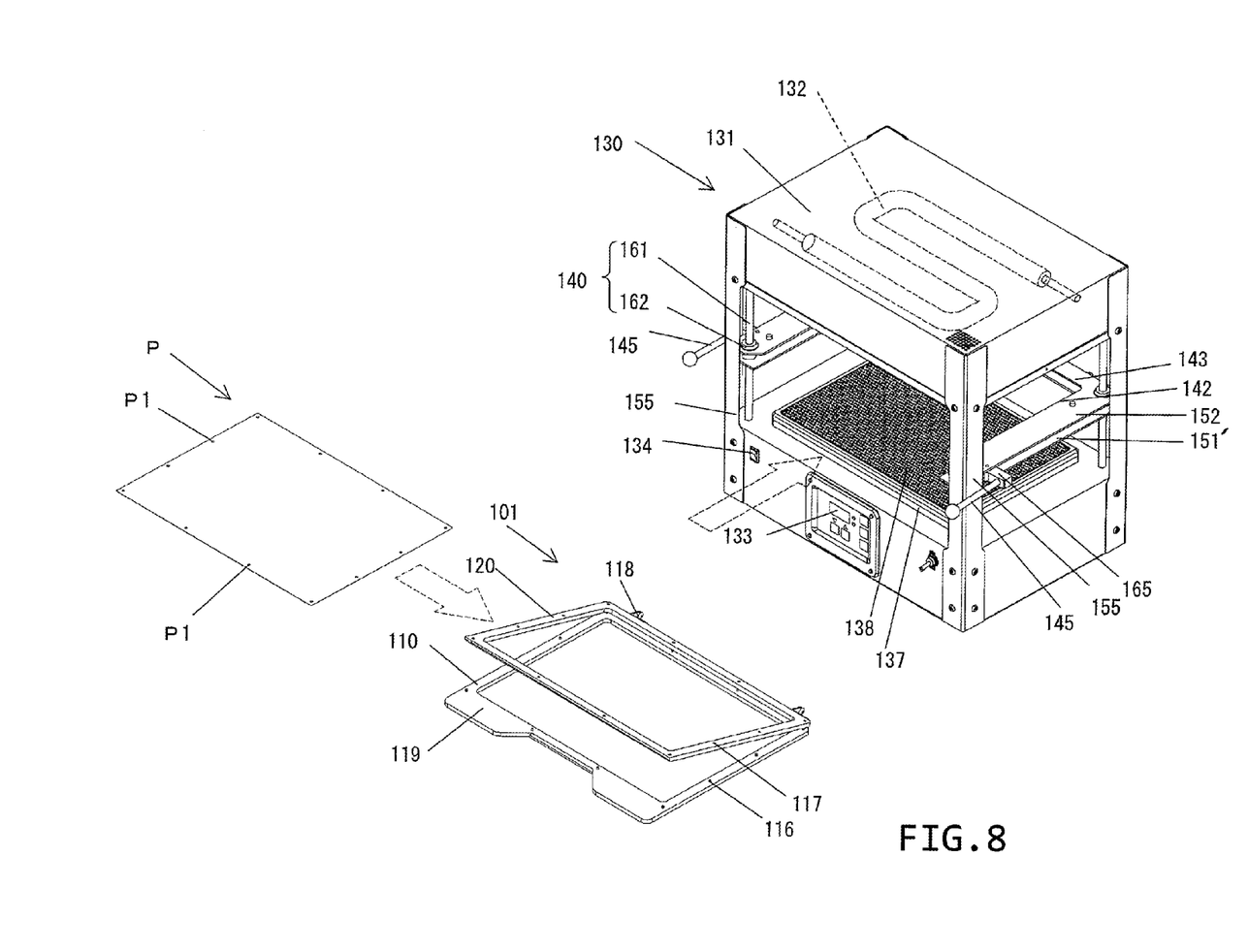
FIG. 8 is a schematic perspective view of a variant of the second embodiment of the thermoforming apparatus according to the present invention.

The cassette slide supports 42 of the cassette fixing frame 41 are formed in a groove shape in cross-section such that the right and left frames of the plastic sheet cassette 1 are slide-fitted in the cassette slide supports 42 from the front side of the cassette fixing frame 41. As shown in FIGS. 5 and 6 representing a second embodiment, a cassette fixing frame 141 is constituted by integrating a lower frame 151 which has a parallelogram shape in a plan view or, as shown in FIG. 8, a substantially U shape opened at the front side in a plan view, which is a variant of the second embodiment of FIG. 5, and an upper frame 152 which also has a substantially U shape opened on the front side in a plan view, arranged in vertically spaced relation with a spacer 153 having a height corresponding to the thickness of a plastic sheet cassette 101, which is interposed between the lower and upper frames 151 and 152. Thus, the cassette fixing frame 141 includes right and left cassette slide supports 142 each having a groove shape in cross-section and a rear support 143 also having a groove shape in cross-section and including the positioning piece on it.

The handle supports 44 of the first embodiment are constituted, for example, by disposing nuts on the cassette slide support 42 such that the operation handles 45 having, e.g., a rod-shape and inserted through the guide slits 39 are screwed into the cassette slide supports 42 (see FIGS. 1 and 3). The cassette fixing frame 41 is made vertically movable along the guide slits 39 which serves as the guide means 40 for the cassette fixing frame 41, by positioning the handle supports 44 on the cassette slide supports 42 of the cassette fixing frame 41 so as to be in alignment with the guide slits 39, and by screwing base portions of the operation handles 45 to the handle supports 44 through the guide slits 39 from the outside of the cabinet 31.

In FIG. 5 representing the second embodiment, the guide means 40 in the first embodiment are provided as guide means 140 constituted by guide poles 161 that are vertically arranged at four corners located at the right and left corners on the front and rear side of the cabinet 131. The cassette fixing frame 141 is constituted by the lower frame 151 and the upper frame 152. The lower and upper frames 151 and 152 include guided bushings 162 formed by cylindrical members fitted in openings bored to allow penetration of the guide poles 161 through the lower and upper frames 151 and 152. With such an arrangement, the cassette fixing frame 141 is smoothly guided vertically along the guide poles 161 through bushings 162 with no inclination.

Referring to the first embodiment, again, the guide slit 39 may have a stop recess in an upper end portion thereof for holding the cassette fixing frame 41 in a temporarily halt state at a position just below the heating source 32 when the cassette fixing frame 41 is moved upward. Moreover, the cassette fixing frame 41 may be resiliently biased upward by a suitable spring, for example. Those modifications are effective in improving operability.

Figure 7A:
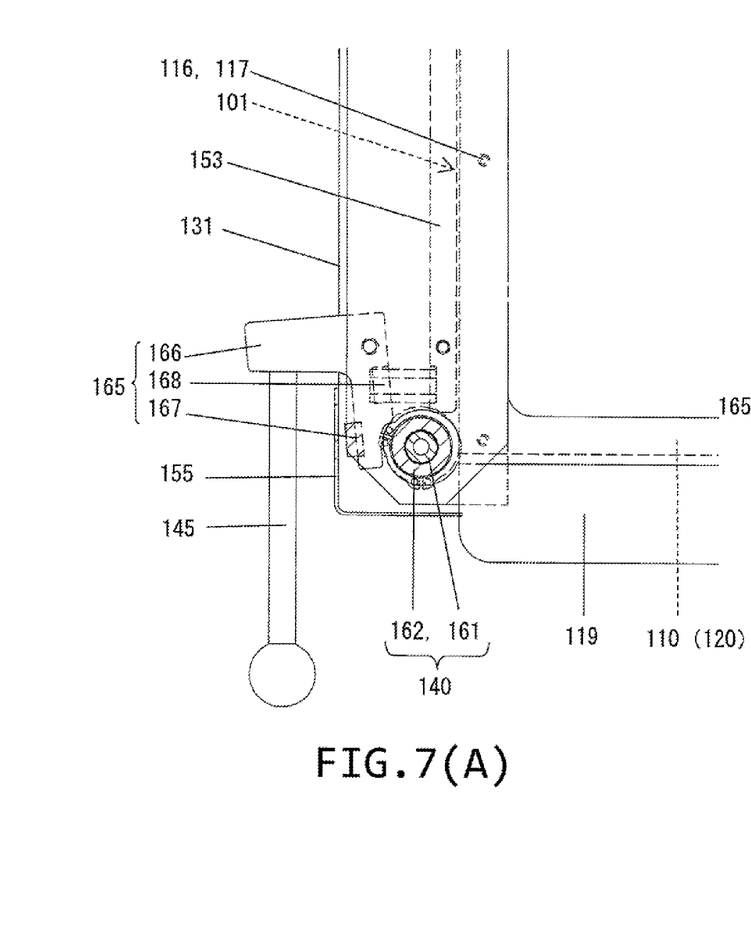
Figure 7B:
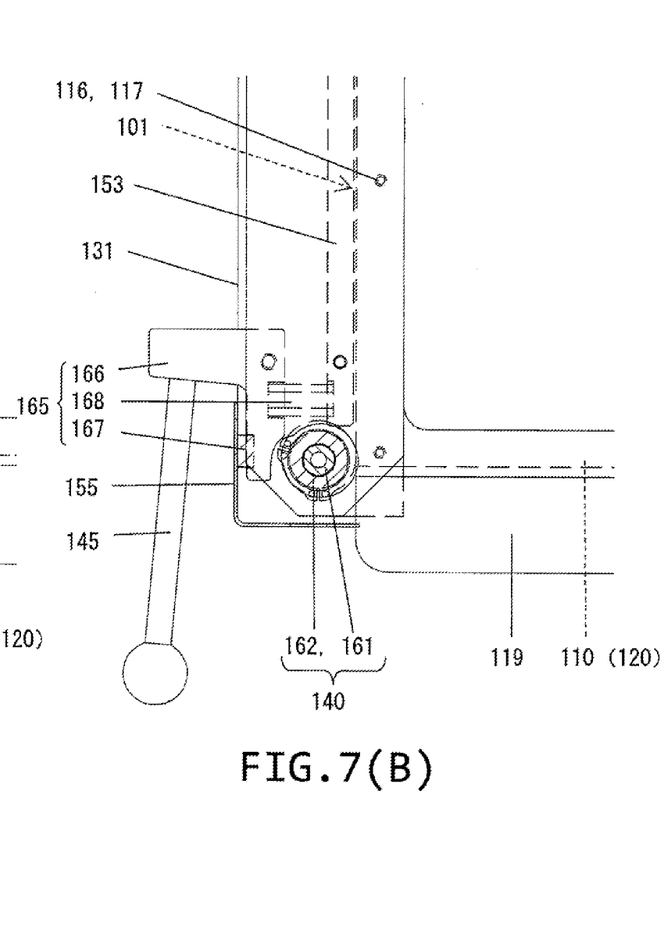

In the second embodiment, as illustrated in FIGS. 5 through 7, operation handles 145 may be supported on handle supports 144 through stopper means 165 such that the cassette fixing frame 141 can be temporarily stopped from vertical movement at or freely moved from a desired level within the cabinet 131. In more detail, as illustrated, the handle supports 144 are disposed at the right and left of the cassette fixing frame 141. The operation handles 145 are supported in an angularly movable on the handle supports 144 and arranged on the right and left sides of the cabinet 131 near the front side such that the operation handles 145 extend and project in the forward direction in a non-operated state. Each stopper means 165 supports the operation handle 145 on the cassette fixing frame 141 through a handle coupling arm 166 which is angularly movable about the handle supports 144. The handle coupling arm 166 is provided with a pressing pad 167 that prevents vertical movement of the cassette fixing frame 141 when the pressing pad 167 is pressed against a structural frame 155 of the cabinet 131, which has a substantially L-shaped cross-section and disposed at each of four corners of the cabinet 131 as illustrated. A resilient member 168 is interposed between the handle coupling arm 166 and the spacer 153 of the cassette fixing frame 141. The pressing pad 167 is always pressed against the frame 155 of the cabinet 131 by a force of the resilient member 168. Thus, the cassette fixing frame 141 is held at any desired level within the cabinet 131. When the operation handle 145 is angularly moved together with the handle coupling arm 166 to release the pressing pad 167 from contact with the frame 155 of the cabinet 131 against the resilient force of the resilient member 168, the cassette fixing frame 141 is made freely movable within the cabinet 131 in the vertical direction.

The operation handles 145 are arranged in pair at the right and left of the cabinet 131 near the front side as illustrated in FIG. 6. When the operation handles 145 are angularly moved inward against the resilient force of the resilient members 168, the pressing pads 167 are released from contact with the frames 155 of the cabinet 131 (see FIG. 7(A)). As a result, the cassette fixing frame 141 can optionally be moved in the vertical direction by firmly grasping the operation handles 145. Conversely, when the operation handles 145 are released from the state angularly moved inward, the pressing pads 167 are again pressed against the frames 155 of the cabinet 131 by the resilient force of the resilient members 168. Thus, the cassette fixing frame 141 is stopped at the level where the operation handles 145 are released, and stays in the stopped position (see FIG. 7(B)).

The operation utilizing the stopper means 165 will be described below. After slide-fitting and loading the plastic sheet cassette 101 which holds the plastic sheet P in the sandwiched state, into the cassette fixing frame 141, the right and left operation handles 145 are angularly moved inward, i.e., toward each other, to thereby render the stopper means 165 inoperative. The cassette fixing frame 141 is elevated to come close to the heating source 132 while producing a predetermined space above a platform 137. The operation handles 145 are returned from the state angularly moved inward, thereby stopping the movement of the cassette fixing frame 141 at that position. The plastic sheet P is then heated and softened. After setting the prototype B on the platform 137, the right and left operation handles 145 are swung to approach each other again to render the stopper means 165 inoperative. The cassette fixing frame 141 is lowered to the level where the heated and softened plastic sheet P is brought into close contact with the prototype B while a vacuum source (not shown) is being operated to make a mold of the plastic sheet P having the same shape as the external contour of the prototype B. After the end of the molding operation, the cassette fixing frame 141 is raised again by operating the operation handles 145, and the prototype B is taken out from the platform 137. Then, the plastic sheet cassette 101 is taken out from the cassette fixing frame 141, and the plastic sheet P formed into the predetermined shape is taken out from the plastic sheet cassette 101.

Anyway, the constitution of a thermoforming apparatus 130 including the cabinet 131, the heating source 132, the vacuum source (not shown), the platform 137, the cassette fixing frame 141, and so on is not limited to the illustrated one. Insofar as the thermoforming apparatus 130 is able to manually perform the operations of: vertically moving the plastic sheet cassette 101 to which the plastic sheet P is fixedly supported in a state held by the cassette fixing frame 141, heating and softening the plastic sheet P at a position close to the heating source 132, and bringing the plastic sheet P into close contact with the prototype B on the platform 137, practical constitutions are not limited to the ones described above and illustrated in the drawings.

One example of a process of manufacturing, e.g., a mold for trial by the thermoforming apparatus 30, 130 utilizing the plastic sheet cassette 1, 101 will be described below. Initially, a predetermined prototype B from which the external contour is to be copied is prepared in advance to manufacture a mold for trial. The prototype B is, for example, one of various shaped goods, e.g., manually produced models, molded chocolate confectioneries, samples made by 3D printers, and so on. The prototype B is placed and set on the platform 37, 137 of the thermoforming apparatus 30, 130.

The plastic sheet P in a predetermined thickness is fixedly supported in the plastic sheet cassette 1, 101 as follows: The plastic sheet P is positioned between the first frame member 10, 110 and the second frame member 20, 120 that are apart from each other. The first frame member 10, 110 and the second frame member 20, 120 are forcedly mated with each other through fitting, for example. By fitting both the frame members with each other, the plastic sheet P is fixedly supported by engagement between the male parts 16, 116 and the female parts 17, 117 with the fixation holes P1 in the peripheral edge of the plastic sheet P being penetrated by the male parts 16, 116. By keeping the first and second frame members in the fitted state, the plastic sheet P is fixedly held in the plastic sheet cassette 1, 101 in the sandwiched state.

Thereafter, the plastic sheet P fixedly held by the plastic sheet cassette 1, 101 is loaded and set into the cabinet 31, 131 of the thermoforming apparatus 30, 130. Namely, the plastic sheet cassette 1, 101 is slid into and supported by the cassette fixing frame 41, 141 which is vertically movable in the cabinet 31, 131 by the handles 45, 145. Then, the cassette fixing frame 41, 141 is raised along the guide means 40, 140 by grasping the handles 45, 145 toward the heating source 32, 132 that is heated with supply of electric power. The plastic sheet P held in the plastic sheet cassette 1, 101 and supported by the cassette fixing frame 41, 141 is thereby heated and softened.

The plastic sheet P after being sufficiently softened is applied to the prototype B with downward movement of the cassette fixing frame 41, 141 by operating the handles 45, 145, and the vacuum source 35 or 135 is operated. With the operation of the vacuum source 35, 135, air present between the platform 37, 137 and the plastic sheet P is evacuated through the perforations 38, 138 and is exhausted from the underside of the platform 37, 137. With the evacuation, the plastic sheet P is brought into close contact with not only the prototype B along its external contour, but also the upper surface of the platform 37, 137. On that occasion, while the plastic sheet P is attracted downward under suction by operation of the vacuum source 35, 135, the cassette fixing frame 41 or 141 may be further pushed downward by an operator manually operating the handles 45, 145. After leaving the plastic sheet P to stand in the close contact state with the prototype B for a predetermined time until solidification of the molded plastic sheet P is completed, the cassette fixing frame 41, 141 is raised again by operating the handles 45, 145 to move away the molded plastic sheet P from the prototype B.

After raising the cassette fixing frame 41, 141, the prototype B is taken out from the platform 37, 137, and the plastic sheet cassette 1, 101 is withdrawn from the cassette fixing frame 41 or 141. The plastic sheet P having been formed into a mold is take out from the plastic sheet cassette 1, 101 by separating the first frame member 10, 110 and the second frame member 20, 120 away from each other. The taken-out plastic sheet P has a recessed contour copying the external contour of the prototype B. Thus, the taken-out plastic sheet P can be utilized, for example, as a mold for producing a prototype, etc.

The invention claimed is:

1. A thermoforming apparatus with use of a plastic sheet cassette, the apparatus comprising:
    a single cabinet which houses within the cabinet:
        a heating source disposed in an upper portion of the cabinet;
        a vacuum source disposed in a lower portion of the cabinet;
        a platform having perforations, which is disposed above the vacuum source and allows a prototype to be placed on the platform;
        a plastic sheet cassette for fixedly supporting a plastic sheet in a detachable way; and
        a cassette fixing frame which is positioned within the cabinet for supporting the plastic sheet cassette in a slidably removable way, and vertically movable within the cabinet between the heating source and the vacuum source,
    wherein the cassette fixing frame has at least right and left cassette slide supports into which right and left frames of the plastic sheet cassette are slide-fitted, respectively, and rear cassette support coupling the right and left cassette slide supports to each other at rear ends of the cassette slide supports,
    wherein the cassette fixing frame is provided with operation handles for operating the cassette fixing frame to move vertically, the operation handles being mounted to the cassette fixing frame through operation handle supports disposed on the cassette fixing frame, to extend outside the cabinet so as to be angularly movable with respect to the surface of the cabinet through resilient members,
    wherein the cabinet includes a guide for guiding the cassette fixing frame to be vertically movable within the cabinet, and
    wherein the operation handles are configured to releasably hold the cassette fixing frame with resilient force applied against the surface of the cabinet at a desired height position along the guide within the cabinet.

2. The thermoforming apparatus according to claim 1, wherein the cassette slide supports of the cassette fixing frame are each formed in groove shape in cross-section allowing the right and left frames of the plastic sheet cassette to be slide-fitted into the cassette fixing frame from a front side of the thermoforming apparatus.

3. The thermoforming apparatus according to claim 1, wherein the plastic sheet cassette is constituted by coupling a first frame member and a second frame member to be opened and closed with a hinge for holding a peripheral edge of the plastic sheet between the first and second frame members, the first and second frame members having opposing surfaces respectively configured to be brought into contact with each other, and
    wherein one of the opposing surfaces includes pins capable of penetrating fixation holes provided in a peripheral edge of the plastic sheet held between the opposing surfaces while the other of the opposing surfaces includes holes capable of receiving the pins of the one of the opposing surfaces, so that the plastic sheet is placed in position once the plastic sheet is held between the opposing surfaces of the first and second frame members.

4. The thermoforming apparatus according to claim 1, wherein the cassette fixing frame is constituted by integrating a lower frame having a parallelogram shape in a plan view and an upper frame having a substantially U shape opened on the front side of the upper frame in a plan view, while keeping a space corresponding to a thickness of the plastic sheet cassette between the lower and upper frames, and
    wherein the cassette fixing frame is configured to include the right and left cassette slide supports each having a groove shape in cross-section, the rear cassette support defining a depth up to which the plastic sheet cassette is inserted on the rear side of the cassette fixing frame, and a front cassette support defined by a front end of the lower frame.

5. The thermoforming apparatus according to claim 1, wherein the guide is constituted by guide poles vertically arranged at plural positions at right and left on the front and rear side of the cabinet, and the cassette fixing frame includes bushings through which the guide poles penetrate.

6. The thermoforming apparatus according to claim 1, wherein the operation handles are mounted to the operation handle supports which are disposed at right and left positions of the cassette fixing frame, so as to be angularly movable through a stopper,
    wherein the stopper comprises handle coupling arms for coupling the operation handles to the cassette fixing frame to be angularly movable, pressing pads provided on the handle coupling arms for being pressed against a structural frame of the cabinet to prevent vertical movement of the cassette fixing frame, and a resilient member interposed between the handle coupling arm and a part of the cassette fixing frame for exerting a resilient force to always press the pressing pad against the structural frame of the cabinet to hold the cassette fixing frame at any desired position within the cabinet in a vertical direction, and
    wherein the cassette fixing frame is vertically movable within the cabinet when the operation handles are each angularly moved together with the handle coupling arm to move the pressing pad in a direction away from the structural frame of the cabinet against the resilient force of the resilient member.

7. The thermoforming apparatus according to claim 1, wherein the cassette fixing frame is constituted by integrating a lower frame and an upper frame each having a substantially U shape opened on the front side thereof in a plan view, while keeping a space corresponding to a thickness of the plastic sheet cassette between the lower and upper frames, and
    wherein the cassette fixing frame is configured to include the right and left cassette slide supports each having a groove shape in cross-section, the rear cassette support defining a depth up to which the plastic sheet cassette is inserted on the rear side of the cassette fixing frame.

\* \* \* \* \*